United States Patent Office 3,037,845
Patented June 5, 1962

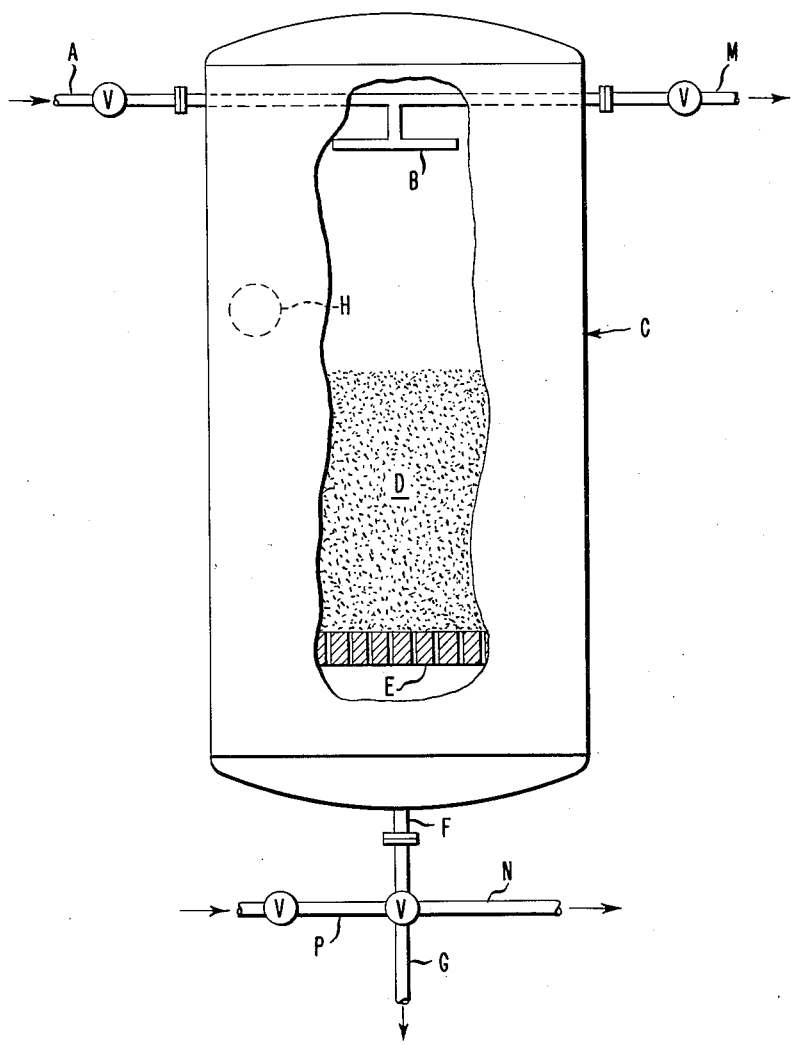

3,037,845
PROCESS FOR RECOVERING BROMINE ADSORBED ON ANION-EXCHANGE RESINS
Rowland Frank Hein, Wilmington, Del., assignor to E. I. du Pont de Nemours and Company, Wilmington, Del., a corporation of Delaware
Filed Jan. 14, 1960, Ser. No. 2,413
1 Claim. (Cl. 23—154)

This invention is directed to a novel process for recovering bromine adsorbed on anion-exchange resins. More particularly, the present invention relates to a method of operation for such recovery wherein a sulfurous reducing agent for bromine is significantly employed. Another aspect of the present novel process is that bromine is recovered from seawater, and other natural or artificial brines, by converting the bromide content thereof to bromine; the bromine is then adsorbed on an anion exchange resin, followed by treatment with a sulfurous reducing agent in the manner described and then recovering the bromine from the resin as a bromide solution significantly more concentrated than the original brine.

Bromine may be adsorbed on anion-exchange resins and eluted as bromide on treatment with sulfur dioxide. The resin holds the bromine as a polybromohalide ion, which is more strongly held than bromide itself or other simple halide ion. Sulfurous substances effect removal of bromine by reducing it to bromide; the equation which follows illustrates this with sulfur dioxide:

$$SO_2 + Br_2 + 2H_2O \rightarrow 2HBr + H_2SO_4$$

Before the present invention, alkaline sodium sulfite or bisulfite had been described for reducing the adsorbed bromine to the bromide form; this use of the reducing agent under alkaline conditions is impractical, for gradually, on repeated exposure to bromine and reducing agent, the resin loses its capacity for adsorbing bromine. On the other hand the resin has been found comparatively stable to the action of both bromine and the reducing agent in the presence of acid.

Theoretically the stoichiometric quantity of sulfur dioxide (or its equivalent as bisulfite or sulfite) should be sufficient to convert all the adsorbed bromine to bromide. However, it has been found that the anion-exchange resin also shows strong affinity for bisulfite ion, and in practice, for example, in columnar bed operation, an excess of reducing agent is needed to reduce the bromine completely; this is clearly illustrated by flowing a solution of sulfurous acid through a stationary columnar bed of granules of resin containing adsorbed bromine, the amount of sulfurous acid employed being equivalent to the amount of bromine adsorbed; this results in the reduction of about a half a column length, the upper half of the bed. The unreacted portion of the reducing agent is held on the upper half of the bed, and the bromine remains on the lower.

Use of substantial excesses of the reducing agent is impractical in commercial operation. Since the simplest recovery and purification of the bromide from the effluent (the product stream leaving the column) is by reoxidation to bromine, any reducing agent accompanying bromide ion in the effluent will have to be oxidized before all the bromide can be recovered, which is wasteful of both the sulfurous substance and the oxidizing agent. Also, so as not to interfere with subsequent reuse of the resin to recover bromine, any of the reducing agent that remains on the resin (as bisulfite ion, the anionic counterpart of the resin's cationic sites) will first have to be removed, as by oxidation or displacement. Eluting the adsorbed reducing agent from the upper half of the column, by use of a brine or acid solution, is unsatisfactory, as rather large volumes of wash liquor are required to move the reducing agent down the column (to where the bromine is on the lower half) and this results in undesirable high dilution of the product stream.

Batch operation, such as mechanically agitating the granules of the resin-bromine complex with an aqueous stoichiometric proportion of the reducing agent until reduction is complete, is also unsatisfactory, not only because it is inherently more costly but because it results in the formation of fines by the abrasive action of the physical equipment on the granules and the granules on one another. Such fines either tend to plug the bed or are lost in economically significant quantities to the aqueous phase, for example, under such conditions as backwashing.

It is an object of the present invention to provide a novel process of reducing the bromine content of a bromine-anion exchange resin complex with sulfur dioxide in the presence of water whereby the sulfurous reducing agent and the resin are efficiently utilized.

Another object of this invention is to provide a novel process for effecting substantially complete reduction of the bromine of a bromine-anion exchange resin complex with a substantially stoichiometric quantity of sulfur dioxide in the presence of water; this process is preferably carried out by utilizing a columnar bed as hereinafter described.

These and other objects will become apparent in the following description and claim.

According to this novel process, the bromine-resin complex is contacted with sulfur dioxide to produce, in the presence of water, a bromide-rich aqueous eluate substantially free of sulfurous reducing agent and the anion exchange resin is left substantially free of sulfurous reducing agent. It is preferable to conduct this process utilizing a columnar bed method of operation wherein the bromine of the bromine-resin complex is completely reduced with the stoichiometric amount of the sulfurous reducing agent; the resulting aqueous effluent contains the bromine as bromide and is substantially free of sulfurous reducing agent; and, the anion exchange resin is left substantially free of the sulfurous reagent and in condition capable of adsorbing bromine.

The present novel process significantly provides the recovery of bromine wherein an anion exchange resin, in form and condition for adsorbing bromine as polybromohalide ions, is contacted with molecular bromine and the bromine-resin complex produced thereby is contacted in the presence of water with sulfur dioxide in substantially stoichiometric amount in such a way as to (1) produce an aqueous effluent containing the bromine as bromide and substantially no sulfurous reagent and (2) leave the resin substantially free of sulfurous reagent and in condition capable of adsorbing bromine substantially as before.

More specifically, the present invention is directed to a novel process which comprises intimately contacting a bed of granules of an anion-exchange resin containing adsorbed bromine with a substantially stoichiometric amount of sulfur dioxide by passing said sulfurous substance in the presence of water counter-gravitationally through said bed at a rate at least sufficient to raise and expand the bed to allow granules of bromine-rich resin to move gravitationally through said bed and countercurrently through said reducing substance, and recovering the resulting bromide-rich effluent.

In a preferred embodiment of the invention, a bromine-rich resin, obtained by contacting the chloride form of a strong base anion-exchange resin with bromine, is contacted in columnar bed operation with an approximate stoichiometric reducing quantity of sulfur dioxide in aqueous stream, said aqueous stream being introduced at the bottom and passed upwards through the bed at a rate that is within the range 1-10 gallons per minute per square foot of resin bed and sufficient to disturb the bed to the extent that the bromine-rich resin granules of the upper regions of the bed sink under gravity through the sulfur dioxide stream and commingle with the less dense sulfur dioxide-reduced resin granules of the lower regions of the bed, then recovering the effluent containing the bromine in reduced form. The rate of flow of the aqueous stream depends, in general, on the particle size of the resin; for example, for a 50-100 mesh resin, 1 gallon per minute per square foot is usually adequate; for lower mesh sizes, say 20 mesh, higher flow rates, say 5-10 gallons per minute per square foot suffices.

In a particularly preferred embodiments of the present invention, sulfur dioxide (or a gas containing it) is blown upwards through the resin bed in contact with an aqueous phase, the quantity of aqueous phase being sufficient at least to wet the resin and fill the voids between the particles, and sufficiently normally to give a freeboard above the resin bed of at least about 10% of the bed depth, preferably 25-50% and usually not more than 100% of the bed depth. The sulfur dioxide-containing gas is normally passed into the bed at a velocity of at least about 2 to 10 linear feet per minute and up to about 60 linear feet per minute to produce optimum results.

The present invention is based on the unexpected discovery that the sulfurous reducing agent can be utilized more effectively, and, the bromine of the bromine-resin complex reduced to and eluted as bromide more efficiently, by employing the reducing medium as heretofore described.

The unexpected increased effectiveness of the present novel process is believed attributable to the resin-bromine complex being significantly more dense than the reduced forms of the resin; that is, the resin with its cationic sites in association with the polybromohalide ions of the bromine-rich form is more dense than in association with anions such as chloride, bromide, bisulfite and bisulfate ions. Introducing the sulfurous reducing substance at the bottom of the resin bed results, on contact with said bed, in reduction of the bromine of the bromine-rich granules. When the inflow pressure of the reducing substance is great enough to disturb the bed to allow movement of resin granules up and down the bed, the lighter (reduced resin) tend to be displaced by the heavier (bromine-rich) from above. The heavier bromine-rich granules, aided by gravity, move countercurrently to the reducing stream, and this countercurrent movement results in additional mixing and more effective contact of the bromine with the reducing agent. Also the bromine-rich resin granules are thus brought into contact with the most concentrated zone of the reducing agent at the lower end of the bed. At the same time the lighter granules rich in reducing agent, as bisulfite ions associated with the resin, tend to be carried by the aqueous stream to the upper reaches of the resin bed where, in presence of water, they contact granules containing unreduced bromine, such contact resulting in reduction of the bromine to bromide. The over-all result is an unexpectedly efficient but mild mixing of the bromine-containing granules with the total reducing medium utilized.

Resins that may be employed are of the quaternary ammonium strong base type. They are essentially long chain-like and web-like water-insoluble molecules characterized by having quaternary ammonium groups integral to the molecular structure. These ammonium groups, the fixed, i.e., non-exchangeable cationic sites of the resin, are associated with anions which make the resin electrically neutral. The anions are the exchangeable constituents of the anion exchange resins and may be varied as desired on proper treatment, as is well known in the art. Typical resins are based on polystyrene backbone; divinylbenzene cross-linking units provide the necessary degree of dimensional stability and water-insolubility to the polymer, while groups of the formula,

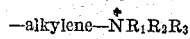

provide the positively charged sites. $R_1$, $R_2$ and $R_3$ are usually alkyl such as methyl, ethyl and the like, but may be alkylol such as hydroxyethyl, and may be joined to constitute along with the nitrogen atom a heterocyclic radical such as methylpiperidinium or pyridinium. Resins such as these may be prepared by reacting a chloromethylated polystyrene-divinylbenzene copolymer with the appropriate tertiary amine.

Specific resins that may be employed in the present invention are described by McBurney in U.S. Patent 2,591,573. Other quaternary ammonium type resins that may be employed are disclosed by Hwa in U.S. Patents 2,630,427 and 2,597,494 and by Bodamer in U.S. Patent 2,597,440.

Resins that may be employed in the present invention are described by McBurney in U.S. Patent 2,591,573. A specific example is the strong base anion exchange resin prepared according to the Examples A-B-C of this patent. The hydroxide form of this resin is converted to the chloride form, for example, by flowing seawater through it. Also, it is understood that commercially available Amberlite IRA 400 listed in the following table is of the class of strong base anion exchange resins described by McBurney in U.S. Patent 2,591,573. In the present process, satisfactory results are obtained with the resins of the patent, for example, of Example A-B-C, as with the commercial article Amberlite IRA 400. The resins described by Patterson and Abrams in U.S. Patent 2,900,352 can also be used; for example, the resin prepared according to Example 5 of this patent. Also the resins described broadly and as specifically shown in Example 2 by Bauman and McKellan in U.S. 2,614,099 may also be used in this process.

Many of the resins are available commercially. Additional representative resins follow; the type I resins are understood to have

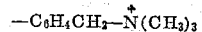

cationic groups; and, the type II resins are believed to contain

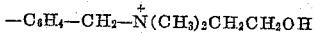

groups; the pyridine type are understood to be based on pyridine as the source of the cationic sites.

STRONG BASE ANION EXCHANGE RESINS

| Commercial Name | Source | Quaternary Ammonium Type |
| --- | --- | --- |
| Duolite A-101 | Chemical Process Co. of Redwood City, California. | I |
| Duolite A-101D | | I |
| Retardion 11A8 | | I |
| Dowex 2 | Dow Chemical Co. of Midland, Michigan. | II |
| Dowex 21 | | II |
| Dowex 1 | | I |
| Dowex 11 | | I |
| Amberlite IRA 400 | Rohm Q Haas Co. of Phila., Pa. | I |
| Amberlite IRA 401 | | I |
| Amberlite IRA 402 | | I |
| Amberlite IRA 410 | | II |
| Amberlite IRA 411 | | II |
| Permutit S-1 | The Permutit Co. of New York, New York. | I |
| Permutit S K | | Pyridine |

The resins utilized according to the present novel process are normally obtained as granules or uniform beads, usually in the hydroxide or chloride form. Preferred particle sizes are 20-100 mesh. The chloride form is more commonly available; however, any form of the resin may be employed, so long as the anionic component is exchangeable by chloride, bromide, polybromochloride, and polybromobromide ions. In addition to the chloride and hydroxide forms, the acetate, nitrate, bisulfate and sulfate, phosphate, fluoride, and the like forms may be used. Treating any of the above with bromine in sodium chloride brine, for example, results in the anions of the resin being displaced by a polybromochloride ion, e.g., $Br_2Cl^-$, $Br_4Cl^-$, $Br_6Cl^-$, $BrCl_2^-$. Simply treating any of the above forms of the resin with aqueous bromine, with and without additional hydrogen bromide or alkali metal bromide present, results in displacement of the original anions by polybromobromide ions, e.g., $Br_3^-$, $Br_5^-$, $Br_7^-$, the hydrolysis of bromine itself being sufficient to provide bromide ions for the exchange. Mixtures of the heretofore described operable resins may be used in practicing this invention.

To recover the bromine, the resin bed containing it is preferably at least as deep or deeper than it is wide, is contacted with sulfur dioxide in the presence of an aqueous phase as herein described. The sulfur dioxide may be the pure gaseous substance itself or mixtures thereof with other gases such as air, nitrogen, carbon dioxide, methane, and the like. A particularly cheap form is known as burner gas resulting from the direct combustion of sulfur in air and consisting essentially of sulfur dioxide and nitrogen. The sulfur dioxide may be used in the gaseous state or as an aqueous solution (sulfurous acid).

The sulfur dioxide (sulfurous acid) may be produced by acidification of sulfurous salts such as sulfites, bisulfites and thiosulfates of metals whose chlorides, bromides, bisulfates and sulfates are water-soluble. Any mineral acid able to liberate sulfurous acid from such salts may be used, for example, the hydrogen halides and sulfates. The quantity of reducing agent (calculated as $SO_2$) adsorbed by the aqueous phase and thus brought in contact with the bromine will be at least about stoichiometric and usually will not amount to more than about a 10% excess over this quanity.

The acidity of the aqueous phase at the time the bromine is reduced is an important practical aspect of the present novel process, for it has been discovered that the resin suffers substantially little or no loss of bromine-adsorbing capacity when treated repeatedly with bromine, and with sulfur dioxide at pH of less than about 2. Sulfur dioxide, employed as heretofore described, provides the desired low pH in otherwise substantially neutral water or brine. When sulfurous salts are used in the aqueous phase as the source of sulfur dioxide, the pH of the solution should be adjusted to 2 or less, conveniently 1–2.

The aqueous medium which may also serve as carrier for the reducing agent may be water or a brine, for example, seawater, dilute, concentrated or saturated sodium chloride, and the like. The concentration of the reducing substance in the aqueous phase should be high enough to provide concentrations of bromide in the effluent that may be conveniently handled, e.g., at least about 500–1000 p.p.m. of bromide. Normally, concentrated solutions will be preferred in order to obtain concentrated solutions of bromine in reduced form. For example, concentrated and saturated solutions of sulfur dioxide in the aqueous phase are conveniently employed. The quantity of sulfur dioxide gas used may also exceed its solubility in the aqueous phase.

The quantity of the aqueous phase as indicated above will be at least sufficient to wet the resin and to receive and elute the reduced bromine. Also the quantity of the sulfurous aqueous phase which will be introduced at the bottom of the column should be sufficient to expand and fluidize the bed so as to result in a redistribution of the heavy and light resin granules as discussed above. from about 0.4 to 1.5 cubic foot of aqueous phase for each cubic foot of resin is conveniently employed at flow rates of about 1 to 10 gallons per minute per square foot of bed surface, with about 2–4 gallons per minute per square foot preferred, to provide adequate expansion of the bed and practical rates of mixing. In the preferred method, the resin and the aqueous phase in columnar bed form and in the above proportions is treated with a sulfur dioxide gas (e.g., burner gas) by passing the gas up through the resin. Normally velocities of from 2 to 10 feet per minute will be sufficient to give the desired mixing and redistribution effects, but up to about 60 feet per minute may also be used.

The source of the bromine and the particular method of adsorbing it on the resin is immaterial to the present process. However, an important embodiment of the invention is the recovery of bromine from natural bromide-containing brines, most importantly seawater. The brine is acidified and oxidized to convert its bromide content to bromine, then passed through an anion-exchange resin of the type herein described. The bromine is then recovered from the resin, as a result of this novel process, as a bromide-rich effluent which can be treated in a variety of ways known in the art to obtain the bromine values therefrom. Specifically, the bromide of the effluent is oxidized to bromine, the bromine stripped in a current of air or steam, and the residual acidic aqueous solution is recycled to acidify the next charge of bromine-rich seawater. Any of the methods described in the art may be used for the recovery of their bromide content as bromine.

An important feature of the present invention is that the resin, after it has been contacted with the sulfurous reducing stream and the effluent removed, is left in a chemical state capable, without further chemical treatment, of being used to absorb bromine from a bromine-rich source such as acidified and chlorinated seawater. The resin does not first have to be treated with a regenerant to place it in operable condition as is usually required in ion exchange processes. This feature is illustrated by Equations 2 and 3 below wherein $R^+$ stands for the resin and its cationic sites, and the resin is employed in its chloride form:

(2) 
(3) 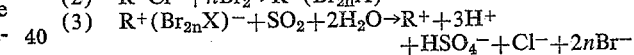

Any of the forms, $R^+Cl^-$, $R^+Br^-$, $R^+HSO_4^-$ may be used directly to absorb bromine from a new bromine-rich charge of acidified and oxidized seawater.

The present novel process may be carried out in conventional ion-exchange equipment, which may be illustrated, in a preferred embodiment, by reference to the annexed drawing, in which the sole figure represents, diagrammatically, a vertical section of a conventional ion-exchange tank with its contents when used according to the present invention. More specifically, tank C is loaded through entry port H with ion-exchange resin to form bed D supported by supporting media E. Inlet pipe A leads to distributor B as in conventional equipment. Pipe M which leads from the upper part of the tank also from distributor B, is also conventional, being arranged as for backwashing exchange resins. The base of tank C, F, serves both inlet pipe P and exits G and N. Pipe P is for introducing the sulfurous reducing medium. In a typical installation, tank C may be 10 feet wide by 16 feet high and loaded to a height of 10 feet with the heretofore-described resin component.

To illustrate the method of the invention and the use of the equipment, seawater, which normally has 65 p.p.m. bromine as bromide is pumped from the sea; this is allowed to settle in a basin and passed through screens to remove sediment and other debris. It is then acidified with an acid, such as hydrochloric or sulfuric or mixtures thereof, to a pH between about 3 and 7, and oxidized with any of the known agents, for example, with chlorine in an amount at least equivalent to the bromide content. About 2.6 lbs. of 10% $H_2SO_4$ per ton of water are added for pH 3.5, and $Cl_2$ is introduced until the potential between platinum and calomel electrodes is between about 900–1020, preferably 980–1020 millivolts, up to about 50% over the theoretical amount of $Cl_2$ usually being required.

The acidified and chlorinated seawater enters, in accordance with the annexed drawing, through pipe A and distributor B into the upper part of tank C. The solution then percolates through the bed D, supporting media E, enters the bottom collector F and passes out through outlet pipe G. Convenient flow rates are 20 to 80 (preferably 40) gallons of seawater per minute per cubic foot of resin and the flow may be continued until the bed becomes saturated and the "break-through" point reached. A typical anion exchange resin containing benzyltrimethylammonium sites holds, on the average, about 6-12 lbs. of bromine per cubic foot at equilibrium with seawater containing 65 p.p.m. bromine. Usually the resin is loaded to about one-quarter to one-half this capacity or about 1½ to 6 lbs./cu. ft. for efficient recovery of the bromine from the seawater. The resin is then backwashed with water, e.g., seawater to remove fine dirt. The bromine-rich resin is normally orange under these conditions, in contrast to the original chloride form which is colorless to light brown.

To recover the bromine from the resin, the reducing agent is added through pipe P. For example, about 40 lbs. of aqueous 10% sulfur dioxide per 10 lbs. of bromine adsorbed on the resin, pumped in via P, F, and E at a rate of 2 gallons per minute per square foot of resin, is sufficient to expand the bed and provide mild agitation. The reducing solution decolorizes the bromine-rich resin on contact. The decolorized resin tends to be carried upwards through the bed by the inflowing aqueous stream, and the bromine-rich granules of the upper regions of the bed tend to sink to the bottom of the bed. The redistribution of the granules of resin and the reduction of bromine in the bromine-containing granules is rapid, being substantially complete when the stoichiometric quantity of $SO_2$ has been added. The aqueous stream rises through bed D and leaves tank C via collector B and outlet M as the bromide-rich effluent which is then collected.

Alternatively, the sulfurous solution introduced, as heretofore described, can be allowed to rise through the bed and then allowed to percolate back down through the bed and eventually be collected through N.

Also air or other gas such as nitrogen or carbon dioxide may be introduced along with the sulfur dioxide solution to provide additional mild agitation and enhance equilibration of the bromide ion between the resin and the effluent.

Finally, if desired, the bed may be rinsed afterwards, via either pipe A or pipe P, by means of a brine solution (seawater, concentrated NaCl, etc.) to elute completely bromide ion from the resin.

The supporting medium for the resin bed may be a bed of gravel, ceramic tile, plastic bonded coke, metallic screen or may consist of two thin metal sheets with offset punched holes such as sold under the name Nevaclog. Supporting medium E also serves as a gas sparger when sulfur dioxide is introduced into the unit through pipe P by way of its opening F.

Distributor B may simply be an opening from inlet pipe B or it may be any of the devices, preferably corrosion resistant, used in the art. For example, it may be a perforated disc or a pipe header with one or more perforated laterals. The bottom of tank C serves as the collector of effluent, draining into pipe G through its opening F.

A preferred variant of the above general procedure is to introduce a limited amount of water or sodium chloride solution into the tank, for example, wet the bromine-rich resin with sufficient water to provide a freeboard above the resin of 10-100% the depth of the bed, and inject a sulfur dioxide-containing gas at the bottom of the bed. For example, for each 2.5 lbs. of bromine per cubic ft. of resin there is added 1.0 to 1.1 lbs. of sulfur dioxide. Injecting the gas at a velocity of 2 to 60 ft./minute ordinarily provides sufficient mixing to contact all the resin with the reducing agent. This expedient, which is not limited by solubility of sulfur dioxide in water, is preferred, especially where high concentrations of hydrogen bromide are desired.

When the treatment of the resin with the reducing agent is completed, the aqueous phase containing bromide ion as hydrobromic acid is then separated from the resin, for example, by draining it away. Generally, as significant quantities of aqueous phase rich in hydrobromic acid are mechanically held by the resin, it is desirable to displace this bromide solution from the resin by washing with one or more volumes of a water solution which is preferably a NaCl brine such as seawater or a mixture of hydrochloric and sulfuric acids.

The aqueous phases from the above treatments with sulfur dioxide and wash liquor will contain substantially all the bromine as hydrogen bromide. It will ordinarily also contain hydrochloric and sulfuric acids in varying amounts. The bromine may be conveniently recovered from the above effluents by oxidation with $Cl_2$ and stripping by known means. It should be noted that since the reduction of the brominated form of the resin by $SO_2$ produces four equivalents of acid, the final solution will contain residual acid (as HCl and $H_2SO_4$) which may be used for acidifying the next batch of bromine-rich brine. This $HCl—H_2SO_4$ mixture may also be used for washing the reduced resin as heretofore described. Thus, in cyclic operation, the recovery of bromine from seawater, according to the present invention, essentially requires only $SO_2$ and $Cl_2$ in addition to the seawater and the ion exchange resin.

The process of the invention has been illustrated with reference to the annexed drawing. However, it is sometimes preferable to employ a series of vessels for effecting the various steps. For example, the resin may be used to recover bromine from acidified and oxidized seawater in a separate tank, and the bromine-laden resin pumped to still another tank (which may be similar to tank C of the drawing) where it may be backwashed to remove fine dirt from the sea. If a separate wash tank is used, the resin after being backwashed is sent to a tank similar to tank C where, with the proper quantity of aqueous phase present as heretofore described, it is treated with sulfur dioxide to reduce the bromine content to bromide. The total charge after reduction, consisting of reduced resin and the bromide-rich aqueous phase, may be handled in a tank similar to tank C as heretofore described or transferred to another vessel where the separation of phases is made and the resin washed.

Additional representative examples illustrating the present invention follow.

*Example 1*

This example illustrates the efficiency of the method of this invention in reducing bromine or a bromine-laden anion exchange resin with sulful dioxide. The resin used as the bromine carrier was a heretofore-described commercial type I strong base anion exchange resin in the form of 50-100 mesh beads having a water content of about 45% by weight. The resin's fixed cationic sites were trimethylbenzyl ammonium groups and its exchangeable anions were chloride ions i.e., the resin was in the chloride form; its capacity was 1.25 milliequivalents per milliliter of resin.

100 ml. of the above resin was mixed with a solution of 3.2 ml. (9.96 g.) of bromine in one liter of water, and after 24 hours the resin, now red-colored, was recovered by filtration. The approximate one liter of filtrate contained 0.06 g. of bromine; the resin had adsorbed 9.9 g. (0.062 mole) of bromine.

The bromine-laden resin was placed in a glass column, 220 mm. long by 40 mm. (inside diameter) wide, equipped with a porous glass plate support below which was a stop-cock. With the stop-cock closed, about 100 ml. of water was added to the resin. Then the stop-cock was opened to let a stream of sulfur dioxide gas pass up through the porous supporting plate at a flow rate of 646 cc./minute at about 25° C., this flow rate being sufficient to effect good mixing of the resin with the surrounding water phase. After 2.4 minutes of contact with the sulfur dioxide at the above rate, which corresponds to a total of about 0.06 mole of sulfur dioxide, the resin became completely decolorized.

In contrast, when 100 ml. of a water solution containing 4 g. (0.063 mole) of sulfur dioxide is passed from the top downward through the same resin identically loaded with 0.062 mole of bromine as above, only the top half of the column length of resin becomes decolorized. The aqueous solution which courses through the lower half of the resin bed before leaving the column is free of the sulfurous reducing agent.

*Example 2*

220 ml. of the resin described in Example 1 was added to 2200 ml. of water containing 21.75 g. of bromine. After 4 hours the deep-colored resin was filtered leaving only 0.17 g. of bromine in the aqueous solution. The total volume of the bromine-laden resin was 212 ml.; 150 ml. of this resin (corresponding to 15.28 g. or 0.095 mole of bromine) was placed along with 150 ml. of water in the apparatus of Example 1 and treated with a 16% by weight mixture of sulfur dioxide in nitrogen by the method of Example 1. The through-part of the gas was about 4 linear feet per minute and in 9 minutes, when a total of 6.3 g. (0.098 mole) of sulfur dioxide had been introduced, the bromine color of the resin was completely discharged. The flow of gas was stopped and the approximate 150 ml. of aqueous solution surrounding the resin was drained from the column and saved (bromide-rich solution 1). The thus-treated resin was placed in a 15 mm. inside diameter column and washed with five 150 ml. portions of a solution prepared by mixing 970 parts by volume of 37% HCl, 330 parts by volume of 98% $H_2SO_4$ and 8700 parts by volume of seawater. The average flow rate of the wash liquor was 2.2 gal./minute/sq. ft. of resin bed. The washings were combined with bromide-rich solution and the bromide content of the total (about 900 ml.) determined to be 14.32 g. (93.7% of theory).

*Example 3*

Example 2 is repeated with seawater as the bromine source. 500 liters of seawater analyzing 0.066 g./liter of bromine as bromide are acidified with concentrated sulfuric acid to pH 3.5 and then treated with about 1 equivalent of chlorine (0.03 g./liter) to oxidize the bromide to bromine. The resulting solution is then passed through a 220 ml. bed of the resin described in Example 1 until the bromine content of the resin amounts to 100 mg./ml. of resin, a loading equivalent to the amount of bromine in 333 liters of seawater. The bromine-laden resin is treated with sulfur dioxide and then washed as described in Example 2. A total aqueous liquor of about 900 ml. is obtained containing 20.0 g. of bromine, analyzed as bromide. This solution, as respect to bromide, is over 300 times more concentrated than the original seawater.

*Example 4*

Satisfactory results are also obtained when Example 3 is repeated using, in place of the commercial resin, a strong base quaternary ammonium type anion exchange resin prepared according to Example A–B–C or U.S. 2,591,573. The hydroxide form of the resin is converted to the chloride form by washing with seawater. Also, the type I strong base anion exchange resin described in Example 5 of U.S. 2,900,352 and the type II strong base anion exchange resin described in Example 2 of U.S. 2,614,099 may be employed with good results according to the method of the invention as illustrated in the preceding examples.

Any of the heretofore-described operable resins may be substituted in the preceding examples to give substantially the same results; mixtures of these resins are also similarly operable.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows:

A process for recovering bromine adsorbed on anion-exchange resin granules as a bromine-resin complex consisting essentially of a strong base type anion exchange resin having adsorbed thereon bromine in the form of polybromohalide ions taken from the group consisting of polybromobromide and polybromochloride ions in association with the resin's fixed cationic sites, said process being one wherein said adsorbed bromine is reduced to bromide with substantially a stoichiometric amount of a sulfurous reducing agent in the presence of water, said reduction being carried out by passing said sulfurous reducing agent, in the presence of water, counter-gravitationally through a bed of said resin granules at a flow rate at least sufficient to raise and expand said resin bed, the granules of said bromine-resin moving gravitationally throughout said bed and counter-currently through said reducing agent, followed by recovering the resulting bromide-effluent.

References Cited in the file of this patent
UNITED STATES PATENTS

| | | |
|---|---|---|
| 2,825,627 | Redniss et al. | Mar. 4, 1958 |
| 2,945,746 | Shaw | July 19, 1960 |